US005437925A

United States Patent [19]

Macaulay et al.

[11] Patent Number: 5,437,925

[45] Date of Patent: Aug. 1, 1995

[54] COATED SUBSTRATE FOR USE AS A TONER RECORDING MEDIUM AND METHOD OF MAKING SAME

[75] Inventors: Norman Macaulay, Tonawanda; Nancy G. Mitchell, Grand Island; Mary R. Dean, Williamsville, all of N.Y.

[73] Assignee: Moore Business Forms, Inc., Grand Island, N.Y.

[21] Appl. No.: 11,715

[22] Filed: Feb. 1, 1993

Related U.S. Application Data

[63] Continuation-in-part of Ser. No. 684,202, Apr. 12, 1991, abandoned.

[51] Int. Cl.[6] .......... B32B 5/16

[52] U.S. Cl. .......... 428/331; 428/341; 428/342; 428/537.5; 430/49

[58] Field of Search .......... 428/323, 331, 327, 537.5, 428/512, 518, 304.4, 341, 342, 219; 430/49

[56] References Cited

U.S. PATENT DOCUMENTS

| | | | |
|---|---|---|---|
| Re. 29,893 | 1/1979 | Shaw | 428/446 |
| 3,055,295 | 9/1962 | Perkins | 101/462 |
| 3,455,241 | 7/1969 | Perkins | 430/496 |
| 3,864,132 | 2/1975 | Rasch et al. | 430/496 |
| 4,259,425 | 3/1981 | Serlin | 430/56 |
| 4,269,891 | 5/1981 | Minagawa | 428/335 |
| 4,425,405 | 1/1984 | Murakami et al. | 428/342 |
| 4,429,032 | 1/1984 | Matthe et al. | 430/231 |
| 4,440,827 | 4/1984 | Miyamoto et al. | 428/327 |
| 4,474,847 | 10/1984 | Schroder et al. | 428/323 |
| 4,478,910 | 10/1984 | Oshima et al. | 428/331 |
| 4,562,140 | 12/1985 | Kohmura et al. | 430/244 |
| 4,617,239 | 10/1986 | Maruyama et al. | 428/452 |
| 4,636,410 | 1/1987 | Akiya et al. | 428/211 X |
| 4,755,396 | 7/1988 | Geisler et al. | 428/145 X |
| 4,755,396 | 7/1988 | Geisler et al. | 428/197 |
| 4,758,461 | 7/1988 | Akiya et al. | 428/212 |
| 4,770,934 | 9/1988 | Yamasaki et al. | 428/331 |
| 4,770,934 | 9/1988 | Yamasaki et al. | 428/331 |
| 4,820,682 | 4/1989 | Shimomura et al. | 503/207 |
| 4,891,285 | 1/1990 | Page et al. | 430/14 |
| 4,900,620 | 2/1990 | Tokita et al. | 428/330 |
| 4,942,410 | 7/1990 | Fitch et al. | 346/160.1 |
| 5,126,010 | 6/1992 | Kobayashi et al. | 162/135 |
| 5,270,103 | 12/1993 | Oliver et al. | 428/219 |

FOREIGN PATENT DOCUMENTS 60-204390 10/1985 Japan .

OTHER PUBLICATIONS

Abstract No. 4073, Miyamoto, Japanese Patent Kokai 204,390, ABIPC vol. 57, No. 3 (Sep., 1986), p. 460.

*Primary Examiner*—Paul J. Thibodeau
*Assistant Examiner*—H. Thi Lê
*Attorney, Agent, or Firm*—Finnegan, Henderson, Farabow, Garrett & Dunner

[57] ABSTRACT

A toner recording medium including a substrate, such as paper, containing a coating composition of particulate silica and a polyvinyl alcohol in a coating weight of less than 2.0 g/m$^2$ per side of the substrate. The composition is preferably about 50 to less than 90 parts by dry weight of particulate silica and about 10 to 50 parts by dry weight binder. A process is also disclosed for coating a substrate, such as paper, to produce a toner recording medium.

16 Claims, No Drawings

COATED SUBSTRATE FOR USE AS A TONER RECORDING MEDIUM AND METHOD OF MAKING SAME

This application is a continuation-in-part of U.S. application Ser. No. 07/684,202, filed Apr. 12, 1991 now abandoned.

BACKGROUND OF THE INVENTION

1. Field of the Invention

The present invention relates to a coating composition that improves the adhesion of toners to receiving substrates, such as paper. More particularly, the invention relates to a toner recording medium including a particular coating composition and a process for producing that toner recording medium.

2. Description of the Prior Art

The use of electrographic means to produce a variety of images for different applications is continuing to expand. Examples of the imaging technologies being employed include electrophotography, magnetography, electrostatics, ink jet, thermal transfer, etc. The materials used to generate the visible images can be dry or liquid toners or aqueous-based, solvent-based or hot melt-based inks. The imaging materials may be fused to the substrate by heat, pressure, a combination thereof or by solvation in the case of toners. There is a need for improved adhesion of toners to substrates to prevent smudging, smearing and flaking of the image encountered in subsequent handling.

In general, paper is used as the imaging substrate in these systems. It has been found that the degree of fuse quality varies with the grade and source of paper used. Also, it is sometimes desirable to image on substrates other than paper such as labels, plastic films, metal foils or textiles.

Prior art uses of coated paper have primarily been directed to ink jet recording uses. Polymeric binders and pigments or particulate silica have been used to form coated substrates for ink jet recording paper and optical bar code printing. Generally, the coatings applied have been in a coating weight of greater than 2 $g/m^2$ per side of the substrate.

Miyamoto et al. U.S. Pat. No. 4,440,827 discloses a process for producing a recording paper for ink jet recording and optical bar code printing, the recording paper including a coating layer of an inorganic pigment and an aqueous polymeric binder. The coating is applied by two or more coating steps and the patent discloses that it is necessary for the total amount of coating per one side to be 10 $g/m^2$ or more, preferably 10 to 25 $g/m^2$.

Oshima et al. U.S. Pat. No. 4,478,910 discloses ink jet recording paper including a base sheet with a coating layer comprising particulate fine silica particles in a water soluble polymeric binder. The coating layer comprises fine silica particles having a specific surface area of more than 200 $m^2/g$ and a water soluble polymeric binder. The preferred coating amount on one side of the substrate is disclosed as between 3–12 $g/m^2$ and the actual coating weights exemplified range from 6–12 $g/m^2$.

Minagawa U.S. Pat. No. 4,269,891 discloses an ink jet recording sheet having a support and an ink absorbing layer thereon. The ink absorbing layer comprises a white pigment and a binder resin, with the weight ratio of pigment to binder ranging from 0.2 to 10. It is disclosed that the ink absorbing power of the ink absorbing layer must be about 1.5 to 18.0 mm/min. Minagawa discloses that a thickness of the coating layer must be at least about 3 micrometers to attain the favorable ink absorbing power.

Akiya et al. U.S. Pat. No. 4,758,461 discloses an ink jet recording paper comprising a substrate including a silicon-containing type pigment and a fibrous material present in a mixed state. The recording paper has a Stockigt sizing degree that can not exceed 15 sec. and a coating weight that can not be less than 2 $g/m^2$.

Murakami et al. U.S. Pat. No. 4,425,405 discloses an ink jet recording sheet comprising a paper support containing a composition of an aqueous dispersion of a binder resin and a white filler. The binder resin is polyvinylpyrrolidone, vinylpyrrolidone-vinylacetate copolymer, or a mixture thereof. The composition is applied in an amount of 3 to 50 $g/m^2$ on a dry basis.

Schroder et al. U.S. Pat. No. 4,474,847 discloses ink jet recording paper that includes a coating of a pigment and/or filler of non-flake structure and a binding agent. The pigment is disclosed as being at least 90% by weight of the dried coating.

Each of the foregoing patents relates to a coated paper for use as ink jet recording paper. There exists a need for a paper that can function as a recording medium for toner imaging that will provide improved adhesion of toners and will resist smudging, smearing and flaking of the toner image in subsequent handling.

The present inventors have found that a toner recording medium obtained by coating a substrate with a dispersion of particulate silica and a polyvinyl alcohol binder to a coating weight of less than 2 $g/m^2$ per side of the substrate provides improved adhesion and reduced smudging, smearing and flaking when using a number of varied substrates including paper, plastic films, metal foils and textiles.

SUMMARY OF THE INVENTION

An object of the present invention is to provide a coating composition which provides improved adhesion of toners to substrates to prevent smudging, smearing and flaking of the image.

A further object of the present invention is to provide a toner recording medium that has improved fuse deterioration, improved pencil receptivity and a lower coefficient of friction.

The above-described objects may be attained in accordance with the present invention by a toner recording medium including a substrate having coated thereon a composition ranging from about 50 to up to 90 parts of a particulate silica and about 10 to 50 parts of a polyvinyl alcohol, by dry weight; preferably from 60 to about 80 parts of a particulate silica and from about 20 to about 40 parts of a polyvinyl alcohol; more preferably, from 65 to about 75 parts of a particulate silica and from about 25 to about 35 parts of a polyvinyl alcohol. The composition is present in a coating weight of less than 2.0 $g/m^2$ per side of the substrate.

In accordance with a further aspect of the invention, there is provided a process for the production of a toner recording medium. The process includes coating a substrate with a formulation of about 25–45 parts of a dispersion of particulate silica, about 10–50 parts of an aqueous polyvinyl alcohol and about 25–45 parts water, by weight; and drying the coated substrate to remove the water. This leaves a composition ranging from about 50 to up to 90 parts silica and about 10 to about 50 parts of a polyvinyl alcohol, by dry weight, in a coating weight of less than about 2.0 $g/m^2$ per side of the substrate.

DETAILED DESCRIPTION OF THE INVENTION

The present invention relates to a coating composition that improves the adhesion of electrographic toners to receiving substrates, such as paper. The coating composition of the invention is obtained from a coating formulation comprising a particulate silica, water and a polyvinyl alcohol binder. As used herein, coating formulation refers to the mixture that is initially applied to the substrate, while coating composition refers to the coating after application and drying.

The coating formulation comprises about 25 to 45 parts by weight of particulate silica, about 10 to 50 parts by weight of an aqueous polyvinyl alcohol binder and about 25 to 45 parts by weight water. The water content may vary widely while maintaining the silica and binder contents within the above ratio. The resulting coating composition may vary from about 50 parts to up to 90 parts silica by dry weight and from about 10 parts to about 50 parts by dry weight polyvinyl alcohol binder.

A preferred coating formulation comprises about 25–45% of a 20% solids dispersion of particulate silica, more preferably 36% in water, about 10–50% of a 10% solution of partially hydrolyzed polyvinyl alcohol, more preferably 28%, and about 25–45% water, more preferably 36%. Alternatively, the particulate silica may be a 12% solids dispersion.

Additional water or some other polar solvent may be added to the coating composition of the invention to adjust viscosity to that most suitable for the coating process used. Suitable polar solvents include alcohols such as isopropanol, ethanol, butanol and mixtures thereof. Other additives may also be included, for example, biocides such as Nalco 7620 WB, which is an aqueous solution of methylene bis thiocyanate and ethylene glycol (available from Nalco Chemical Co., Naperville, Ill.), defoamers such as polyglycols Nalco 2311, 2340 or 2308 (Nalco Chemical Co.), slip agents such as zinc stearate, calcium stearate and stearamide or anti-offset compounds such as wheat starch, pea starch and cellulose fibers.

The coating composition according to the present invention is particularly useful in toner imaging. The coating composition provides improved adhesion to substrates to prevent smudging, smearing and flaking of the toner image. The coating composition may be applied to any of the commonly known substrates such as paper, plastic films, metal foils or textiles. Specific applications include financial documents or titles which require a very high degree of security to prevent image alteration, and also documents which require resistance to subsequent handling to prevent rub, smear, flaking, crease, erasure, tape pick, and scratch.

In accordance with the invention, the coating formulation may be applied by conventional techniques such as flexo, gravure, reverse roll, air-knife, etc. It may be full-coated or spot coated. Drying of the coating may be effected by conventional means such as hot air convection, microwave or infrared. When using coated paper of the invention in a laser printer, it is desirable that the moisture content of the paper range from 4.2–5%, to avoid the paper being too conductive (water content too high) or a buildup of static electricity (water content too low).

The coating of the invention can optionally include a sizing agent (size). The size is preferably composed predominantly of starch, but can incorporate other fillers or additives such as, for example, calcium carbonate, clay, titanium dioxide, polyvinyl alcohol, styrene acrylic polymers, styrene maleic anhydrides, melamine formaldehyde resins, glyoxal, zirconium salts or quaternized amides. The size can be acidic, alkaline or neutral.

A mixture of the coating of the invention and a size can be applied to unsized substrates by use of, for example, a two station coater, a duplex coater, a two station printing press or a twin-roll horizontal or vertical size press.

Application of a mixture of coating and size can be accomplished, for example, by a size press, which involves passing the substrate wound on a roll through a pond containing the mixture of coating and size. The amount of pickup and degree of impregnation achieved are determined by the substrate absorbency and compressibility, surface temperature, rheology, speed of the roll and roll hardness, each of which can be controlled to achieve the desired results. A metering rod or trailing blades may be used in the coating rolls to control application rates.

Sizing can also be achieved by film transfer. Film transfer surface sizing involves use of short-dwell coating heads that provide a film to the size press walls.

The coating composition of the invention is applied to a coat weight of less than 2.0 grams per square meter per side of substrate, preferably between 0.8 and 1.6 $g/m^2$ per side of the substrate, and more preferably about 1.1 or 1.2 $g/m^2$. The coating weight is preferably applied in a single coating step. It has been found by the inventors that, at coating weights substantially greater than 2.0 $g/m^2$, fuse (toner adherence when subjected to folding and scratching) deteriorates, pencil receptivity is poor, and the coefficient of friction increases making feeding to printers and stackers more difficult.

Particulate silicas that can be used in the invention include, for example, CAB-O-SPERSE® II, CAB-O-SPERSE® A-205, CAB-O-SPERSE® A-105, CAB-O-SPERSE® P-1175, CAB-O-SPERSE® S-109, CAB-O-SPERSE® P-1010 (available from Cabot Corporation, Cab-O-Sil Division, Tuscola, Ill.) and Aerosil 130, Aerosil 200 and Aerosil MOX80, available from Degussa Corp., Ridgefield Park, N.J. CAB-O-SPERSE® II, CAB-O-SPERSE® S-109 and CAB-O-SPERSE® A-205, each of which is an aqueous slurry of colloidal, fumed, synthetic silica, are preferred. CAB-O-SPERSE® II is a 20% dispersion of silica in water, the silica having a pH of 9.0 to 10.5. CAB-O-SPERSE® S-109 is also a 20% dispersion of silica in water, the silica having a pH of 5.0 to 5.5. CAB-O-SPERSE® A-205 is a 12% dispersion of silica in water, the silica having a pH of 5.0 to 5.5. A particulate silica is preferably utilized that has a uniformity number n for the Rosin-Rammler distribution ranging from 1.0–2.6.

The preferred particulate silicas useful in the present invention have a specific surface area ranging from 90–270 $m^2/g$ as measured by the BET method. The preferred particulate silicas have a particle size ranging from about 0.5 to about 10 microns.

The polyvinyl alcohol that can be used in the invention is not limited but preferred is a 10% aqueous solution of Vinol 540, which is a partially hydrolyzed (87–89%) polyvinyl alcohol (available from Air Products and Chemicals, Inc., Allentown, Pa.).

The substrate to which the coating composition is applied is not limited but generally will be paper that is wood pulp based having a Stockigt sizing degree of greater than about 25 seconds and a basis weight ranging from about 16 to 32 pounds, preferably about 24 pounds.

A particularly preferred composition for the coating of the invention is:

| Material | Weight percent |
|---|---|
| CAB-O-SPERSE II | about 36 |
| Water | about 36 |
| 10% Vinol 540 | about 28 |
| Nalco 2311 | 0.035 |
| Nalcon 7620-WB | 0.023 |

The present invention will be described more completely with reference to the following examples, which in no case may be regarded as limiting the invention.

Example 1

| | |
|---|---|
| CAB-O-SPERSE S-109 (silica) | 35.95% |
| 10% Vinol 540 (binder) | 28.10% |
| Water | 35.95% |

was full-coated on both sides of 24# OCR bond on a flexo coater to a coat weight of 1.1 g/m$^2$/ side and a moisture content of 5%. The roll was converted to both continuous and cut sheet product, preprinted with heat set inks and tested along with the uncoated base sheet on the following copiers and printers:

Xerox 1090, Xerox 5052, Xerox 9700 (all dry toner hot roll fusers);

STC 6100 (dry toner, cold vapor fusing); and

Ion Deposition (dry toner, cold pressure fusing).

Fuse quality was rated in the areas of crease resistance and tape pick up. In every case, fuse quality of the coated sheet was superior to that of the uncoated sheet. See Table 1, below.

Example 2

The method according to Example 1 was repeated except that the coating formulation was applied as a 1" by 5" spot with a 110 anilox roll on a conventional flexo press on 24# OCR bond and then dried with an RF dryer.

The results obtained are set forth in Table 1, below.

Example 3

The method of Example 2 was repeated except the formulation was coated onto the face of a label stock having a 60# OCR facestock and 50# release liner.

The results obtained are set forth in Table 1, below.

Example 4

The method of Example 2 was repeated except the formulation was coated onto the back of the release liner of a label having a 60# OCR facestock and 50# release liner.

The results obtained are set forth in Table 1, below.

Example 5

A coating formulation as follows:

-continued

| | |
|---|---|
| 12% CAB-O-SPERSE ® A-205 | 60 pts. |
| 10% Vinol 540 | 28 pts. |
| Water | 12 pts. |

was coated onto the face of a label stock having a 60# OCR facestock and 50# release liner. The coating formulation was applied at 1.1 g/m$^2$ with a 120 anilox roll on a conventional press.

The results obtained are set forth in Table 1.

Example 6

A coating formulation as follows:

| | |
|---|---|
| 20% CAB-O-SPERSE ® S-109 | 35.95% |
| 10% Vinol 540 | 28.10% |
| Water | 35.95% |

was coated onto the face of a label stock having a 3 mil polyester facestock and a 40# liner. The coating formulation was applied at 1.1 g/m$^2$ with a 200 anilox roll on a conventional press.

The results obtained are set forth in Table 1.

Test Method for Measuring the Toner Anchorage/Adhesion

To evaluate the toner anchorage properties the following procedure was used.

Tape Pick-Up

A 4" strip of Magic tape (3M brand scotch tape) was applied to the printed area to be tested using light finger pressure. Medium finger pressure was then applied back and forth over the taped area for a total of 10 passes. The end was grasped and the tape was slowly peeled from the printed area.

Magic tape was lightly applied to another test area and carefully removed and placed on the record sheet.

Crease

The substrate was folded inward and creased in the printed area. The substrate was unfolded and scratched in the folded area using light pressure.

Calculations

The printed product toner anchorage/adhesion was rated on a scale from 1 to 6, 1 being the best. The evaluation was subjective and depended upon the before and after testing appearance of the image.

The breakdown of the scale is as follows:

1—No toner loss

2—Slight toner loss detected only on tape-product good

3—Visible toner loss from image-product marginal

4—Moderate toner loss from image-product below standard

5—Heavy toner loss, flaking or image damage-product failure

6—No toner adherence to the substrate-product failure far beyond that rated as 5

TABLE 1

| Equipment | Image Material | Fuse Method | Substrate | Adhesion Crease | Adhesion Tape |
|---|---|---|---|---|---|
| Xerox 1090 | 2-C toner | hot roll | 24# Bond | 4 | 3 |
| | | | Ex. 1 | 1 | 1 |
| | | | Ex. 2 | 1 | 1 |
| | | | uncoated FS | 5 | 4 |

TABLE 1-continued

| Equipment | Image Material | Fuse Method | Substrate | Adhesion Crease | Adhesion Tape |
|---|---|---|---|---|---|
| | | | uncoatedRel | 6 | 6 |
| | | | Ex. 3 | 1 | 1 |
| | | | Ex. 4 | 1 | 1 |
| | | | Ex. 5 | 1 | 1 |
| Xerox | 2-C | hot | 24# Bond | 3 | 3 |
| 5052 | toner | roll | Ex. 1 | 1 | 1 |
| | | | Ex. 2 | 1 | 1 |
| | | | uncoated FS | 5 | 4 |
| | | | uncoatedRel | 6 | 6 |
| | | | Ex. 3 | 1 | 1 |
| | | | Ex. 4 | 1 | 2 |
| Xerox | 2-C | hot | 24# Bond | 3 | 3 |
| 9700 | toner | roll | Ex. 1 | 1 | 1 |
| STC | 2-C | vapor | 24# Bond | 2 | 3 |
| 6100 | toner | | Ex. 1 | 1 | 1 |
| IBM | 2-C | hot | 24# Bond | 5 | 4 |
| 3836 | toner | roll | Ex. 1 | 1 | 1 |
| Delphax | MC | pressure | 24# Bond | 4 | 5 |
| 2460 | toner | | Ex. 1 | 2 | 1 |
| QMS-CF | | flash | 2 mil. | 6 | 6 |
| 2215 | | fusion | polyester | | |
| | | | Ex. 6 | 1 | 1 |

uncoated FS = Uncoated facestock (control)
uncoatedRel = Uncoated release (control)

We claim:

1. A toner recording medium comprising:

a substrate having coated thereon a toner receptive composition consisting essentially about 50 to up to 90 parts of a particulate silica and about 10 to 50 parts of a polyvinyl alcohol, by dry weight, in a coating weight of less than 2.0 g/m$^2$ per side of the substrate;

wherein the substrate has a Stockigt sizing degree before coating greater than 25 seconds.

2. The toner recording medium of claim 1, wherein the coating weight is between about 0.4 and about 2.0 g/m$^2$ per side of the substrate.

3. The toner recording medium of claim 1, wherein the coating weight is between about 0.8 and about 1.6 g/m$^2$ per side of the substrate.

4. The toner recording medium of claim 1, wherein the coating weight is between about 1.0 and about 1.4 g/m$^2$ per side of the substrate.

5. The toner recording medium of claim 1, wherein the coating weight is about 1.2 g/m$^2$ per side of the substrate.

6. The toner recording medium of claim 1, wherein the coating weight is about 1.1 g/m$^2$ per side of the substrate.

7. The toner recording medium of claim 1, wherein the composition further contains a biocide and a defoamer.

8. The toner recording medium of claim 1, obtained by coating on the substrate a formulation comprising about 25–45% of a 20% solids dispersion of particulate silica in water, about 10–50% of a 10% aqueous solution of partially hydrolyzed polyvinyl alcohol, and about 25–45% water, by weight, followed by drying.

9. The toner recording medium of claim 1, obtained by coating on the substrate a formulation comprising about 36% of a 20% solids dispersion of particulate silica in water, about 28% of a 10% aqueous solution of partially hydrolyzed polyvinyl alcohol, and about 36% water, by weight, followed by drying.

10. The toner recording medium of claims 1, obtained by coating on the substrate a formulation comprising about 25–45% of a 12% solids dispersion of particulate silica in water, about 10–50% of a 10% aqueous solution of partially hydrolyzed polyvinyl alcohol, and about 25–45% water, by weight, followed by drying.

11. The toner recording medium of claim 1, obtained by coating on the substrate a formulation comprising about 36% of a 12% solids dispersion of particulate silica in water, about 28% of a 10% aqueous solution of partially hydrolyzed polyvinyl alcohol, and about 36% water, by weight, followed by drying.

12. The toner recording medium of claim 1, wherein said particulate silica is present in an amount ranging from about 60 to about 80 parts and said polyvinyl alcohol is present in an amount ranging from about 20 to about 40 parts, by dry weight.

13. The toner recording medium of claim 1, wherein said particulate silica is present in an amount ranging from about 65 to about 75 parts and said polyvinyl alcohol is present in an amount ranging from about 25 to about 35 parts, by dry weight.

14. The toner recording medium of claim 1, wherein said particulate silica is present in an amount of about 72 parts and said polyvinyl alcohol is present in an-amount of about 28 parts, by dry weight.

15. The toner recording medium of claims 1, wherein said composition further comprises a sizing agent.

16. The toner recording medium according to claim 15, wherein said sizing agent comprises starch.

* * * * *